(12) United States Patent
Imai (10) Patent No.: US 10,995,909 B2
(45) Date of Patent: May 4, 2021

(54) HYDROGEN TANK BODY AND METHOD OF PRODUCING THE SAME, AND HYDROGEN TANK AND METHOD OF PRODUCING THE SAME

(71) Applicant: TOYOTA JIDOSHA KABUSHIKI KAISHA, Toyota (JP)

(72) Inventor: Katsuki Imai, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 400 days.

(21) Appl. No.: 15/900,291

(22) Filed: Feb. 20, 2018

(65) Prior Publication Data

US 2018/0238491 A1    Aug. 23, 2018

(30) Foreign Application Priority Data

Feb. 21, 2017   (JP) .............................. JP2017-029558

(51) Int. Cl.
*B29C 69/00*      (2006.01)
*F17C 1/16*       (2006.01)
(Continued)

(52) U.S. Cl.
CPC ................ *F17C 1/16* (2013.01); *B29C 49/20* (2013.01); *B29C 69/007* (2013.01); *F17C 1/06* (2013.01); *F17C 13/06* (2013.01); *B29C 2049/2404* (2013.01); *B29K 2077/00* (2013.01); *B29K 2083/00* (2013.01); *B29K 2995/0067* (2013.01); *B29L 2009/00* (2013.01); *B29L 2031/7156* (2013.01); *F17C 2201/0109* (2013.01); *F17C 2201/056* (2013.01); *F17C 2203/012* (2013.01); *F17C 2203/0604* (2013.01); *F17C 2203/066* (2013.01); *F17C 2203/0607* (2013.01); *F17C 2203/0624* (2013.01); *F17C 2203/0663* (2013.01); *F17C 2203/0675* (2013.01); *F17C 2203/0685* (2013.01); *F17C 2205/0305* (2013.01); *F17C 2205/0397* (2013.01); *F17C 2209/2127* (2013.01); *F17C 2209/2154* (2013.01); *F17C 2209/221* (2013.01); *F17C 2209/232* (2013.01); *F17C 2221/012* (2013.01);
(Continued)

(58) Field of Classification Search
None
See application file for complete search history.

(56) References Cited

U.S. PATENT DOCUMENTS 7,549,555 B2 *  6/2009  Suzuki ..................... F17C 1/16
                                                        220/581
2009/0203845 A1  8/2009  Fukui et al.
(Continued)

FOREIGN PATENT DOCUMENTS

EP    1 072 664 A1   1/2001
JP    06-170992 A    6/1994
(Continued)

*Primary Examiner* — Monica A Huson
(74) *Attorney, Agent, or Firm* — Finnegan, Henderson, Farabow, Garrett & Dunner, LLP (57) ABSTRACT

A hydrogen tank body includes a base layer formed of a synthetic resin selected from the group consisting of silicon resin, polyphenylene sulfide, polybutylene terephthalate, polyvinyl chloride, polypropylene, polyethylene, and polycarbonate, and a liner layer formed of hydrogen impermeable resin, on an inside wall surface of the base layer.

7 Claims, 5 Drawing Sheets

(51) Int. Cl.
- *F17C 13/06* (2006.01)
- *F17C 1/06* (2006.01)
- *B29C 49/20* (2006.01)
- *B29L 9/00* (2006.01)
- *B29K 77/00* (2006.01)
- *B29K 83/00* (2006.01)
- *B29L 31/00* (2006.01)
- *B29C 49/24* (2006.01)

(52) U.S. Cl.
CPC ........... *F17C 2223/0123* (2013.01); *F17C 2223/036* (2013.01); *F17C 2227/0381* (2013.01); *F17C 2260/018* (2013.01); *F17C 2270/0168* (2013.01); *F17C 2270/0184* (2013.01); *Y02E 60/32* (2013.01)

(56) References Cited

U.S. PATENT DOCUMENTS

2010/0234551 A1* 9/2010 Ikeno .............. C08L 83/08
                                                    528/36
2015/0014332 A1    1/2015 Nishibu

FOREIGN PATENT DOCUMENTS

| JP | 2001-040301 A | 2/2001 |
| JP | 2005-315367 A | 11/2005 |
| JP | 2009-191871 A1 | 8/2009 |
| JP | 2014-513250 A | 5/2014 |
| JP | 2015-017641 A | 1/2015 |
| WO | WO2012-129701 A | 10/2012 |

\* cited by examiner

HYDROGEN TANK BODY AND METHOD OF PRODUCING THE SAME, AND HYDROGEN TANK AND METHOD OF PRODUCING THE SAME

INCORPORATION BY REFERENCE

The disclosure of Japanese Patent Application No. 2017-029558 filed on Feb. 21, 2017 including the specification, drawings and abstract is incorporated herein by reference in its entirety.

BACKGROUND

1. Technical Field

The disclosure relates to a hydrogen tank body, a method of producing the hydrogen tank body, a hydrogen tank, and a method of producing the hydrogen tank.

2. Description of Related Art

A hydrogen tank body formed of a polyamide resin composition having excellent hydrogen impermeability is known (see Japanese Patent Application Publication No. 2009-191871 (JP 2009-191871 A), for example). The hydrogen tank body functions as a liner layer in a hydrogen tank.

SUMMARY

However, the hydrogen tank body formed of a polyamide resin composition is likely to cause variations in dimensions during molding, due to processing characteristics of the polyamide resin composition. Accordingly, a technology for reducing or preventing variations in the dimensions of the hydrogen tank body has been desired.

The disclosure provides a technology for reducing or preventing variations in dimensions of a hydrogen tank body.

A first aspect of the disclosure is concerned with a hydrogen tank body. The hydrogen tank body according to the first aspect includes a base layer containing a synthetic resin selected from the group consisting of silicon resin, polyphenylene sulfide, polybutylene terephthalate, polyvinyl chloride, polypropylene, polyethylene, and polycarbonate, and a liner layer containing a hydrogen impermeable resin and placed on an inside wall surface of the base layer.

The hydrogen tank body according to the first aspect uses any one of silicon resin, polyphenylene sulfide, polybutylene terephthalate, polyvinyl chloride, polypropylene, polyethylene, and polycarbonate, which are synthetic resins that can be more easily molded than polyamide resin compositions. Accordingly, variations in dimensions during molding can be reduced or prevented.

In the hydrogen tank body according to the first aspect, the hydrogen impermeable resin may be polyamide 6. In this case, the hydrogen tank body in which the liner layer is formed of polyamide 6 is provided.

In the hydrogen tank body according to the first aspect, the synthetic resin may be silicon resin. In this case, the hydrogen tank body in which the base layer is formed of silicon resin is provided. Since the base layer of the hydrogen tank body is formed of silicon resin having mold releasability, no mold release agent needs to be applied by coating when the hydrogen tank is formed. Accordingly, the time for drying the mold release agent thus applied is not required, and the time required for production of the hydrogen tank can be shortened.

In the hydrogen tank body as described above, the silicon resin may be dimethylpolysiloxane. In this case, the hydrogen tank body in which the base layer is formed of dimethylpolysiloxane is provided.

A second aspect of the disclosure is concerned with a hydrogen tank. The hydrogen tank according to the second aspect includes the hydrogen tank body according to the first aspect, and a pressure resistant layer that is placed on an outer surface of the hydrogen tank body, and is in direct contact with the hydrogen tank body. According to the second aspect, the hydrogen tank in which the pressure resistant layer and the hydrogen tank body are in direct contact with each other with no mold release agent interposed therebetween is provided.

A third aspect of the disclosure is concerned with a method of producing a hydrogen tank body. The method of producing the hydrogen tank body according to the third aspect includes a step of forming a base layer of the hydrogen tank body, using a synthetic resin selected from the group consisting of silicon resin, polyphenylene sulfide, polybutylene terephthalate, polyvinyl chloride, polypropylene, polyethylene, and polycarbonate, and a step of forming a liner layer along an inside wall surface of the base layer, by subjecting a hydrogen impermeable resin to blow molding, using the base layer as a mold form for the blow molding. According to the third aspect, after the base layer is formed of the synthetic resin having excellent moldability, the hydrogen impermeable resin is subjected to blow molding, using the base layer as the mold form for the blow molding. Thus, since the base layer having smaller variations in dimensions is formed prior to the liner layer, variations in dimensions of the hydrogen tank body can be reduced or prevented.

In the method according to the third aspect, the base layer may be formed by subjecting the synthetic resin to injection molding. In this case, the hydrogen tank body including the base layer formed by injection molding is provided. Since the base layer of the hydrogen tank body is formed by injection molding, welding that would cause variations in dimensions when the hydrogen tank body is formed may be unnecessary. Accordingly, variations in dimensions when the hydrogen tank body is formed can be reduced or prevented.

In the method according to the third aspect, the hydrogen impermeable resin may be polyamide 6. In this case, the hydrogen tank in which the liner layer is formed of polyamide 6 is provided.

In the method according to the third aspect, the synthetic resin may be silicon resin. In this case, the hydrogen tank in which the base layer is formed of silicon resin having mold releasability is provided.

In the method as described above, the silicon resin may be dimethylpolysiloxane. In this case, the hydrogen tank body in which the base layer is formed of dimethylpolysiloxane is provided.

A fourth aspect of the disclosure is concerned with a method of producing a hydrogen tank. The method of producing the hydrogen tank according to the fourth aspect includes a step of forming a hydrogen tank body by the method according to the third aspect, and a step of forming a pressure resistant layer by directly winding carbon fiber reinforced resin around the hydrogen tank body. According to the method of producing the hydrogen tank according to the fourth aspect, when the pressure resistant layer is formed, no mold release agent is applied by coating to the hydrogen tank body. Accordingly, there may be no need to dry the mold release agent, and the time required for production of the hydrogen tank can be shortened.

This disclosure can be realized in various forms. For example, the disclosure can be realized in forms, such as a fuel cell system, and a fuel cell vehicle, which use hydrogen tanks.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

A. First Embodiment

A1. Configuration of Hydrogen Tank

Figure 1:
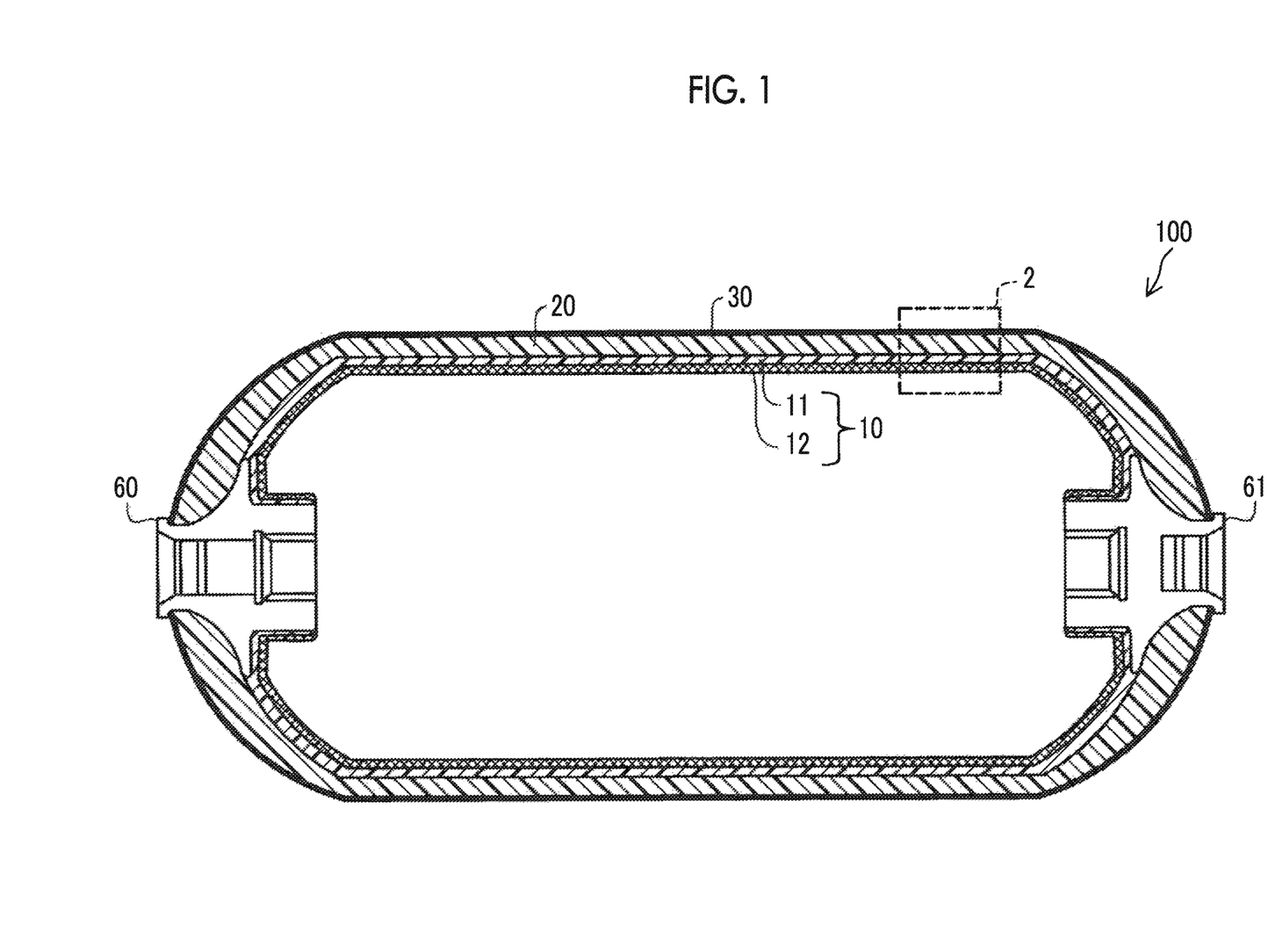
FIG. 1 is a schematic view of a hydrogen tank according to a first embodiment.

FIG. 1 schematically shows a hydrogen tank 100 according to a first embodiment. The hydrogen tank 100 includes a hydrogen tank body 10, a pressure resistant layer 20, a protective layer 30, a first cap 60, and a second cap 61. The hydrogen tank 100 is constructed such that the hydrogen tank body 10 having a hollow interior is covered with the pressure resistant layer 20 and the protective layer 30. The first cap 60 and the second cap 61 are respectively disposed at longitudinally opposite ends of the hydrogen tank body 10. The hydrogen tank 100 is filled with compressed hydrogen, and is installed on a fuel cell vehicle so as to supply hydrogen to a fuel cell, for example. The hydrogen tank 100 is not limitedly installed on the fuel cell vehicle, but may be installed in a mobile object, such as a ship or an airplane, or a stationary facility, such as a house or a building.

The hydrogen tank body 10 is a hollow container having a base layer 11 and a liner layer 12. The hydrogen tank body 10 has a generally cylindrical shape having hemispherical dome portions at opposite ends, and forms the shape of the hydrogen tank 100. The hydrogen tank body 10 has hydrogen impermeability, namely, is impermeable to hydrogen, and hydrogen gas that fills its interior space is inhibited from leaking to the outside. Also, the hydrogen tank body 10 has a mechanical strength high enough to prevent the tank body 10 from being damaged or deformed due to shock or pressure applied to it when the hydrogen tank 100 is produced.

The pressure resistant layer 20 is formed so as to cover the entire area of the outer surface of the hydrogen tank body 10 and parts of the first cap 60 and the second cap 61 while being in close contact with the tank body 10 and the caps 60, 61. The pressure resistant layer 20 is formed of carbon fiber reinforced resin (CFRP: Carbon Fiber Reinforced Plastics) as a composite material of thermosetting resin and carbon fibers, and has pressure resistance. As the thermosetting resin, epoxy resin or unsaturated polyester resin may be used. In this embodiment, epoxy resin is employed.

The protective layer 30 is formed so as to cover the outer surface of the pressure resistant layer 20 while being in close contact with the layer 20. The protective layer 30 is formed of glass fiber reinforced resin (GFRP: Glass Fiber Reinforced Plastics) as a composite material of thermosetting resin and glass fibers, and has higher shock resistance than the pressure resistant layer 20. As the thermosetting resin, epoxy resin or unsaturated polyester resin may be used. In this embodiment, epoxy resin is employed.

The first cap 60 is formed of stainless steel, and has a generally cylindrical shape having a through-hole that communicates with the interior of the hydrogen tank body 10. The first cap 60 is mounted in the hydrogen tank body 10 before the pressure resistant layer 20 is formed. The first cap 60 functions as an opening of the hydrogen tank 100, and also functions as an attaching portion for attaching a pipe or a valve to the hydrogen tank 100. The first cap 60 also functions as an attaching portion for attaching the hydrogen tank body 10 to a filament winding device when the pressure resistant layer 20 and the protective layer 30 are formed. While the first cap 60 is formed of stainless steel in this embodiment, it may be formed of a metal, such as aluminum, other than stainless steel.

The second cap 61 is formed of stainless steel, and has a generally columnar shape. The second cap 61 is mounted in the hydrogen tank body 10 before the pressure resistant layer 20 is formed, and is assembled with the pressure resistant layer 20 and the protective layer 30 such that a part of the second cap 61 is exposed to the outside through the protective layer 30. The second cap 61 functions as an attaching portion for attaching the hydrogen tank body 10 to a filament winding device when the pressure resistant layer 20 and the protective layer 30 are formed. The second cap 61 also has a function of conducting heat in the interior of the hydrogen tank 100 to the outside. While the second cap 61 is formed of stainless steel in this embodiment, it may be formed of a metal, such as aluminum, other than stainless steel.

Figure 2:
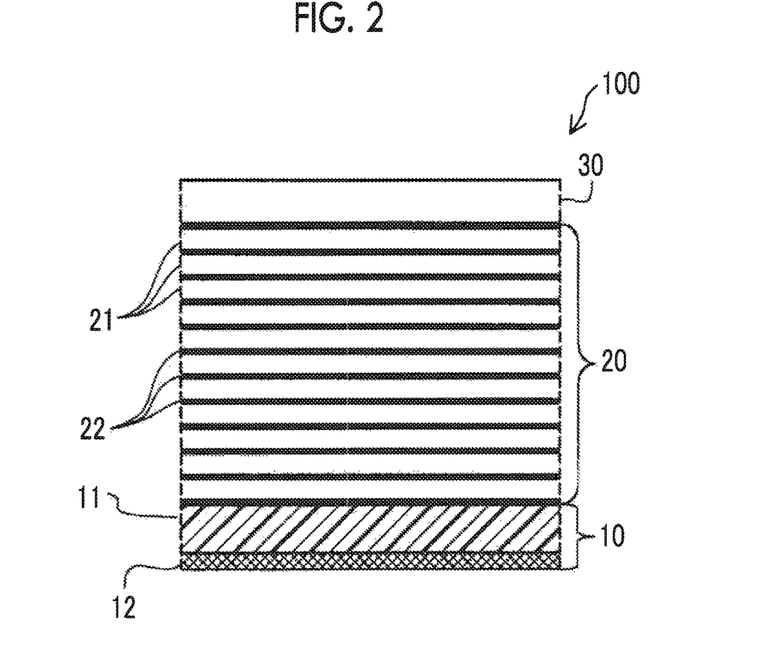
FIG. 2 is a cross-sectional view of a wall of the hydrogen tank according to the first embodiment.

FIG. 2 is a cross-sectional view of a wall 2 of the hydrogen tank 100 according to the first embodiment. The hydrogen tank body 10 includes a base layer 11 and a liner layer 12. The pressure resistant layer 20 is constructed such that carbon fiber reinforced resin layers 21 are laminated, and bonded to each other with an adhesive 22 placed between each pair of adjacent resin layers 21.

The base layer 11 is a member that determines the dimensions and shape of the hydrogen tank body 10. In this embodiment, the base layer 11 is formed of silicon resin as a synthetic resin, and has mold releasability, namely, is capable of being released from a mold. The silicon resin has mold releasability, and more excellent moldability than polyamide 6. The moldability can be evaluated based on the tensile strength and the tensile elongation. As the silicon resin, dimethylpolysiloxane, or methyl phenyl silicon may be used, for example. In this embodiment, dimethylpolysiloxane is used. Since the hydrogen tank body 10 includes the base layer 11 having mold releasability, the tank body 10 can smoothly expand and contract in accordance with variations in the pressure within the hydrogen tank body 10, without adhering to the pressure resistant layer 20. The mechanical strength of the hydrogen tank body 10 is determined by the base layer 11; therefore, the base layer 11 needs to have a strength that is determined in advance so that the base layer 11 is not broken, for example, due to pressure and shock applied thereto during production of the hydrogen tank 100. In this embodiment, the thickness of the base layer 11 is set to 4 mm, so that the strength of the hydrogen tank body 10 becomes equal to or higher than the predetermined strength. It is, however, to be noted that the thickness of the base layer 11 need not be strictly equal to 4 mm, but may be equal to a thickness within the range from about 3.2 mm to about 4.8 mm.

The liner layer 12 is formed of hydrogen impermeable resin that is impermeable to hydrogen, and shuts off or inhibits leakage of hydrogen gas filling the interior space to the outside. As the hydrogen impermeable resin, polyamide 6, ethylene vinyl alcohol, fully saponified polyvinyl alcohol may be used, for example. In this embodiment, polyamide 6 is employed as the hydrogen impermeable resin. The thickness of the liner layer 12 is set to a thickness that is determined in advance so that the liner layer 12 can prevent leakage of hydrogen gas. In this embodiment, the thickness of the liner layer 12 is set to 1 mm, so that leakage of hydrogen gas can be prevented when the internal pressure of the hydrogen tank 100 becomes equal to 150 MPa. It is, however, to be noted that the thickness of the liner layer 12 need not be strictly equal to 1 mm, but may be equal to a thickness within the range from about 0.8 mm to about 1.2 mm.

A2. Production Method

Figure 3:
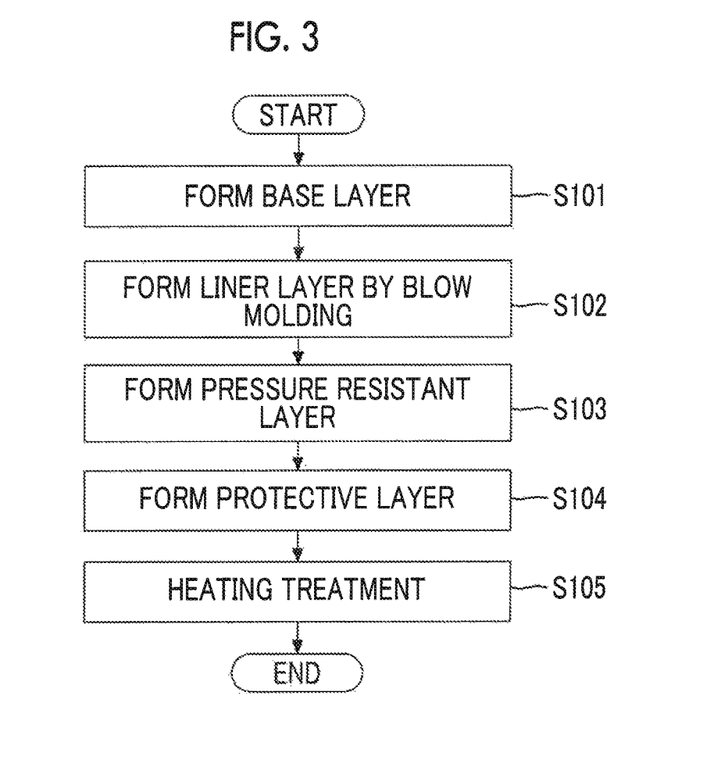
FIG. 3 is a flowchart of a process for production of the hydrogen tank according to the first embodiment.

FIG. 3 is a flowchart of a process for production of the hydrogen tank 100 according to the first embodiment. In the production of the hydrogen tank 100, the base layer 11 of the hydrogen tank body 10 is formed by subjecting silicon resin to injection molding (step S101). The injection molding makes it possible to reduce burr as compared with other molding methods, and reduce variations in dimensions. The first cap 60 and the second cap 61 are mounted into the base layer 11 by insert molding or press fitting. In this embodiment, the caps 60, 61 are mounted by insert molding. When the insert molding is used, the strength of mounting portions can be improved, as compared with the case where the caps 60, 61 are mounted by press fitting.

The liner layer 12 is formed by subjecting hydrogen impermeable resin to blow molding (step S102). When the blow molding is performed, the base layer 11 is used as a mold form for blow molding. The liner layer 12 is formed along an inside wall surface of the base layer 11. Details of the blow molding will be described later. The hydrogen tank body 10 is formed through step S101 and step S102.

After formation of the hydrogen tank body 10 is completed, the pressure resistant layer 20 is formed on the outer periphery of the hydrogen tank body 10, by a filament winding method (FW method) (step S103). More specifically, the hydrogen tank body 10 is used as a mandrel, and carbon fiber reinforced resin in the form of carbon fibers impregnated with epoxy resin is directly wound around the hydrogen tank body 10.

After formation of the pressure resistant layer 20 on the outer periphery of the hydrogen tank body 10 is completed, the protective layer 30 is formed on the outer periphery of the pressure resistant layer 20 by the FW method (step S104). More specifically, glass fiber reinforced resin in the form of glass fibers impregnated with epoxy resin is wound on the outer periphery of the pressure resistant layer 20.

After formation of the protective layer 30 is completed, the hydrogen tank body 10 on which the pressure resistant layer 20 and the protective layer 30 are formed is heated, so that the epoxy resin contained in the pressure resistant layer 20 and the protective layer 30 is cured (step S105).

Figure 4:
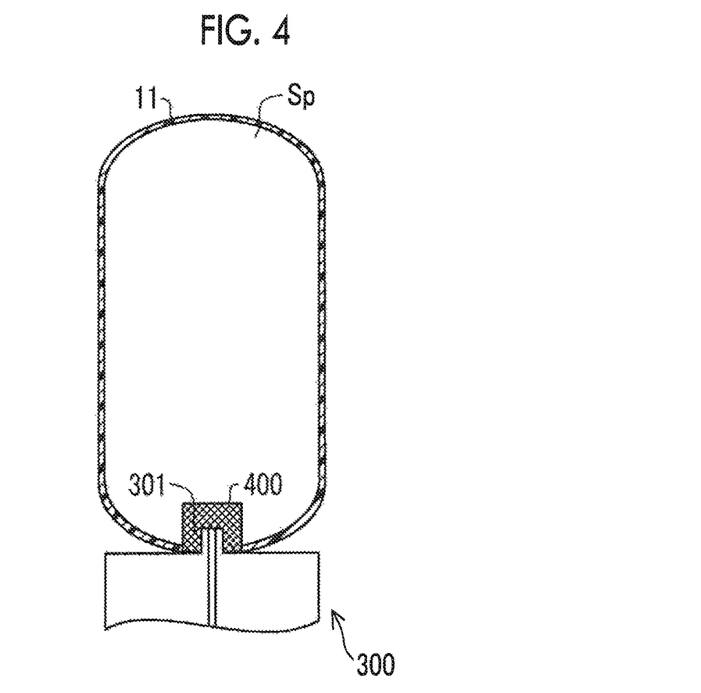
FIG. 4 is a schematic view showing a condition in which a base layer is attached to a blow molding machine.
Figure 5:
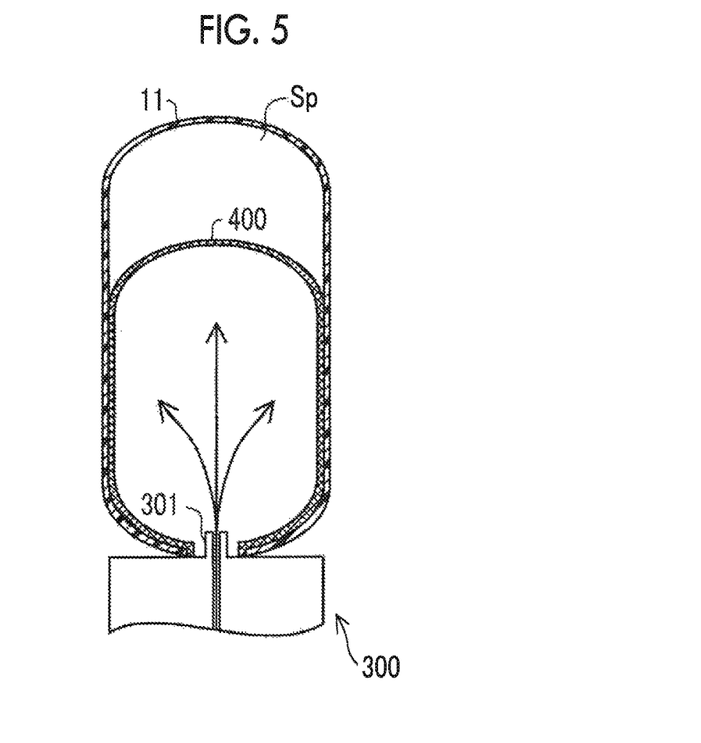
FIG. 5 is a schematic view showing a process of blow molding.
Figure 6:
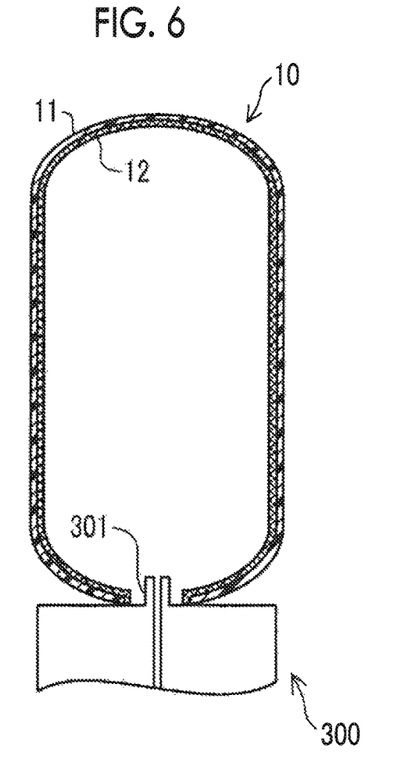
FIG. 6 is a schematic view showing a condition at the time of completion of blow molding.

Referring next to FIG. 4, FIG. 5, and FIG. 6, blow molding (step S102) in the process for production of the hydrogen tank 100 according to the first embodiment will be described. FIG. 4 schematically shows a condition in which the base layer 11 is attached to a blow molding machine 300. FIG. 5 schematically shows a process of blow molding. FIG. 6 schematically shows a condition at the time of completion of the blow molding. While the first cap 60 and the second cap 61 are actually mounted in the base layer 11, the first cap 60 and the second cap 61 are not illustrated in FIG. 4, FIG. 5, and FIG. 6.

As shown in FIG. 4, a parison 400 as hydrogen impermeable resin formed in a cylindrical shape is attached to an air inserting portion 301 of the blow molding machine 300. The parison 400 is heated to about 225° C. as the melting point of the hydrogen impermeable resin. The base layer 11 functions as a mold form for use in blow molding. As shown in FIG. 5, compressed air is injected from the air inserting portion 301 into the parison 400, so as to inflate it into the shape of a bag. The blow molding machine 300 injects compressed air into the parison 400, and also discharges air in internal space Sp of the base layer 11 to the outside. When the second cap 61 has a through-hole, the air in the internal space Sp may be discharged from the second cap 61. As shown in FIG. 6, the parison 400 is pressed against the base layer 11, so that the liner layer 12 is formed along the inside wall surface of the base layer 11. The base layer 11 and the liner layer 12 need not be bonded to each other. During blow molding, attention needs to be paid so as not to generate air bubbles between the base layer 11 and the liner layer 12.

A3. Comparative Example

In the following, the hydrogen tank 100 according to the first embodiment is compared with a hydrogen tank 200 as a comparative example.

Figure 7:
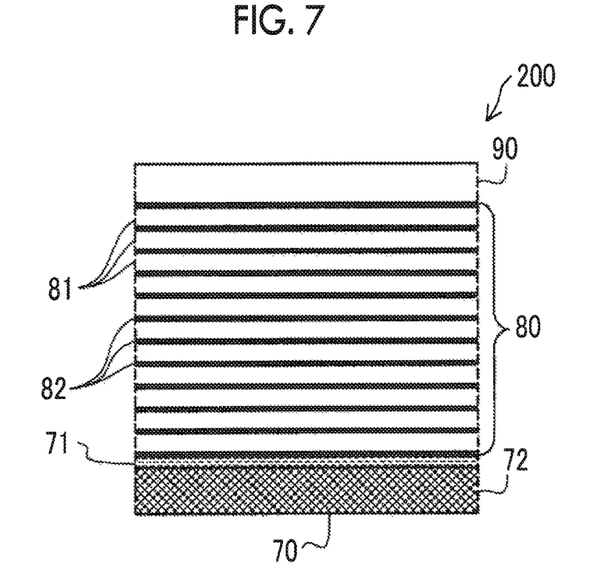
FIG. 7 is a cross-sectional view of a wall of a hydrogen tank according to a comparative example.

FIG. 7 is a cross-sectional view of a wall of the hydrogen tank 200 as the comparative example. In the hydrogen tank 200 as the comparative example, a hydrogen tank body 70 is formed solely from a liner layer 72 made of polyamide 6 as hydrogen impermeable resin, and a mold release layer 71 made of a mold release agent is formed between the hydrogen tank body 70 and a pressure resistant layer 80. The mold release agent is used, since the hydrogen tank body 70 is formed of polyamide 6 that does not have mold releasability. As the mold release agent, silicon oil or wax is used, for example. The liner layer 72 of the comparative example also functions as a base layer that determines the shape and dimensions of the hydrogen tank body 70, and the thickness of the liner layer 72 is set to be larger than the thickness of the liner layer 12 of the first embodiment, so that the liner layer 72 has sufficient mechanical strength.

Figure 8:
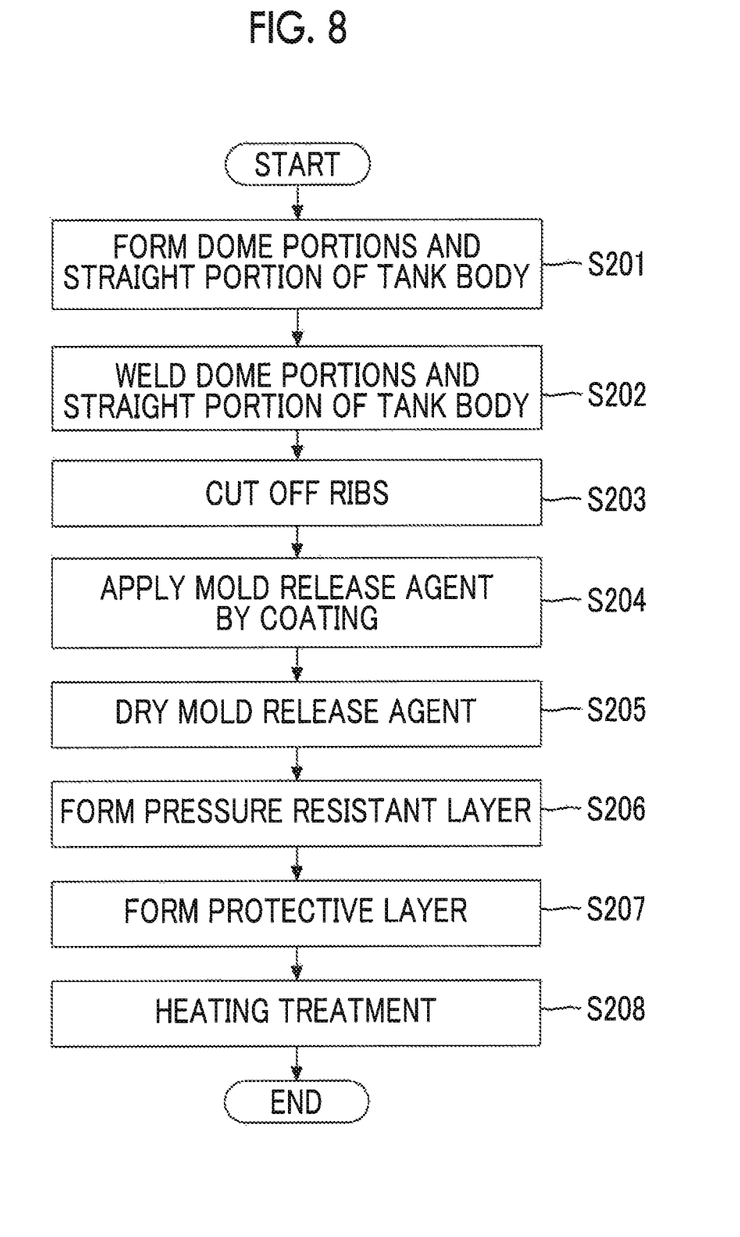
FIG. 8 is a flowchart of a process for production of the hydrogen tank according to the comparative example.

FIG. 8 is a flowchart of a method of producing the hydrogen tank 200 according to the comparative example. The hydrogen tank body 70 is divided into dome portions and a straight portion, and formed (step S201). The dome portions are formed by injection molding, and the straight portion is formed by extrusion molding. The dome portions and straight portion that are formed separately are welded together (step S202), and ribs that are formed by welding and protrude outward are cut off (step S203). With the ribs thus cut off, the hydrogen tank body 70 is formed. After the hydrogen tank body 70 is formed, a mold release agent is applied by coating to an outer surface of the hydrogen tank body 70 (step S204), and the mold release agent thus applied by coating is dried (step S205). After the mold release agent is dried, the pressure resistant layer 80 is formed on the outer periphery of the hydrogen tank body 70 by the FW method (step S206), and a protective layer 90 is formed on the outer periphery of the pressure resistant layer 80 (step S207). The hydrogen tank body 70 on which the pressure resistant layer 80 and the protective layer 90 are formed is subjected to heating treatment (step S208), so that the hydrogen tank 200 is completed.

In the comparative example, the outer wall surface of the hydrogen tank body 70 is coated with the mold release agent diluted with water, so that the hydrogen tank body 70 and the pressure resistant layer 80 are prevented from adhering to each other. The mold release agent is a hydrophobic substance, and is inhomogeneously distributed in the liquid water in which it is diluted; therefore, it is difficult to apply the mold release agent evenly to the hydrogen tank body 70. Accordingly, some portions of the hydrogen tank body 70 may not be sufficiently coated with the mold release agent, and the hydrogen tank body 70 and the pressure resistant layer 80 may adhere to each other at their portions where they are in direct contact with each other with no mold release agent interposed therebetween. If the hydrogen tank body 70 and the pressure resistant layer 80 adhere to each other, stress may be concentrated at the adhering portion of the hydrogen tank body 70, and the hydrogen tank body 70 may be broken, when the hydrogen tank 200 is filled with high-pressure hydrogen gas, and the internal pressure of the hydrogen tank 200 is increased.

The thermosetting resin used for forming the pressure resistant layer 80 is prevented from being cured when it reacts with water. Accordingly, the pressure resistant layer 80 needs to be formed after the mold release agent is dried, and the time required for production is prolonged.

The hydrogen tank body 70 is formed using polyamide 6 having lower moldability than silicon resin used for the base layer 11 of the first embodiment. Therefore, in the comparative example, variations may arise in dimensions when polyamide 6 is molded. Further, when the hydrogen tank body 70 is formed, the hydrogen tank body 70 is divided into the dome portions and the straight portion, which need to be welded together after being molded. Thus, at the time of welding, too, variations may arise in dimensions of the hydrogen tank body 70.

Thus, there are limitations to the shape and dimensions of the hydrogen tank body 70, because of the moldability and mechanical strength of polyamide 6.

In the first embodiment, the outer surface of the hydrogen tank body 10 is formed of silicon resin having mold releasability. Thus, in the first embodiment, the hydrogen tank body 10 and the pressure resistant layer 20 do not adhere to each other, even when the hydrogen tank body 10 and the pressure resistant layer 20 are in direct contact with each other with no mold release agent interposed therebetween. Also, the time required for production of the hydrogen tank 100 can be shortened, as compared with the comparative example.

In formation of the hydrogen tank body 10, after the base layer 11 is formed from silicon resin as synthetic resin having smaller variations in dimensions during molding than polyamide 6 used for the liner layer 12, the liner layer 12 is formed on the inside wall surface of the base layer 11. Since the dimensions of the hydrogen tank body 10 are determined by the base layer 11 having smaller variations in dimensions, the hydrogen tank body 10 has smaller variations in dimensions as compared with the hydrogen tank body 70 of the comparative example. Further, the injection molding used for formation of the base layer 11 in the first embodiment is a molding method causing smaller variations in dimensions than other molding methods; therefore, variations in dimensions can be further reduced.

In the first embodiment, the hydrogen tank body 10 is formed using silicon resin having higher moldability than polyamide 6 used for the hydrogen tank body of the comparative example, thus making it possible to form the hydrogen tank body 10 without dividing it into two or more parts. Accordingly, the formation of the hydrogen tank body 10 does not require welding, which would cause variations in dimensions. Since welding is not performed, ribs are not produced, and there is no need to cut off the ribs.

Dimethylpolysiloxane that forms the hydrogen tank body 10 of the first embodiment has higher mechanical strength and more excellent moldability than polyamide 6. In the first embodiment, when the hydrogen tank body 10 is formed, the dimensions and shape are less likely to be limited as compared with the hydrogen tank body 70 of the comparative example. Accordingly, the hydrogen tank body 10 of the first embodiment can be formed with longer dimensions than those of the hydrogen tank body 70 of the comparative example, and can assume a shape other than the cylindrical shape of general hydrogen tanks.

According to the hydrogen tank 100 of the first embodiment as described above, silicon resin having high moldability is used for forming the base layer 11 that determines the dimensions of the hydrogen tank body 10. Thus, it is possible to form the hydrogen tank body 10 without dividing it into two or more parts, and welding that would cause variations in dimensions is not required in the process of forming the hydrogen tank body 10. Consequently, it is possible to curb or prevent occurrence of variations in the dimensions of the hydrogen tank body.

According to the hydrogen tank 100 of the first embodiment, the base layer 11 of the hydrogen tank body 10 which faces the pressure resistant layer 20 is formed of silicon resin having mold releasability. Accordingly, no mold release agent needs to be applied by coating between the hydrogen tank body 10 and the pressure resistant layer 20. Thus, when the hydrogen tank 100 is produced, the pressure resistant layer 20 can be formed so as to directly contact with the outer periphery of the hydrogen tank body 10, and the process of drying the mold release agent becomes unnecessary; therefore, the time required for production of the hydrogen tank 100 can be shortened.

B. Second Embodiment

A second embodiment is different from the first embodiment in that the base layer 11 is divided into two or more parts and formed, in the process for production of the hydrogen tank body 10. After the base layer 11 is divided and formed, hydrogen impermeable resin is applied by coating to an inside wall surface of the base layer 11, so as to form the liner layer 12. The base layer 11 thus divided and formed and the liner layer 12 are welded together, so that the hydrogen tank body 10 is formed. In other aspects of the configuration and production method, the second embodiment is substantially identical with the first embodiment. Although welding is performed in formation of the hydrogen tank body 10 in the second embodiment, it is possible to reduce variations in dimensions as compared with the hydrogen tank body 70 of the comparative example, since silicon resin having higher strength than polyamide 6 is used for the base layer 11. Since the liner layer 12 is formed by coating, it is possible to form the liner layer 12 in a shape that is difficult to form through blow molding.

According to the second embodiment, the liner layer 12 is formed by coating. Accordingly, the hydrogen tank body 10 can be formed in a more complicated shape, as compared with the case where the liner layer 12 is formed by blow molding.

C. Modified Example

In each of the above embodiments, the base layer 11 is formed of silicon resin having mold releasability. However, the base layer 11 may be formed of resin that does not have mold releasability. When the base layer 11 is formed of synthetic resin that does not have mold releasability, a mold release agent is applied by coating to the outer surface of the base layer 11. In this modified example, the synthetic resin is selected from synthetic resins having more excellent moldability than polyamide compositions (e.g., polyamide 6) having hydrogen impermeability. For example, polyphenylene sulfide, polybutylene terephthalate, polyvinyl chloride, polypropylene, polyethylene, or polycarbonate may be used as the synthetic resin. In this connection, the moldability can be evaluated based on the tensile strength, and the tensile elongation. According to the modified example, the effect of reducing or preventing variations in dimensions of the hydrogen tank body can be obtained, as in each of the above embodiments. Also, it is possible to reduce limitations to the shape and dimensions.

This disclosure is not limited to the above embodiments and modified example, but may be realized with various configurations, without departing from the principle thereof. For example, the technical features in the embodiments, which correspond to the technical features described in "SUMMARY" and below may be replaced or combined as appropriate, so as to solve a part or all of the problems as described above, or achieve a part or all of the effects as described above. If the technical features are not described as essential ones in this specification, the features may be deleted as appropriate.

What is claimed is:

1. A method of producing a hydrogen tank body, the method comprising:
    forming a base layer of the hydrogen tank body, using a synthetic resin selected from the group consisting of silicon resin, polyphenylene sulfide, and polyvinyl chloride; and
    forming a liner layer along an inside wall surface of the base layer, by subjecting a hydrogen impermeable resin to blow molding, using the base layer as a mold form for the blow molding.

2. The method according to claim 1, wherein the base layer is formed by subjecting the synthetic resin to injection molding.

3. The method according to claim 1, wherein the hydrogen impermeable resin is polyamide 6.

4. The method according to claim 1, wherein the synthetic resin is the silicon resin.

5. The method according to claim 4, wherein the silicon resin is dimethylpolysiloxane.

6. A method of producing a hydrogen tank, the method comprising:
    forming a hydrogen tank body by the method according to claim 4; and
    forming a pressure resistant layer by directly winding carbon fiber reinforced resin around the hydrogen tank body.

7. The method according to claim 6, wherein the silicon resin is dimethylpolysiloxane.

* * * * *